June 2, 1936.  H. L. EATZ  2,043,158
DIRECTION INDICATOR
Original Filed Sept. 12, 1932
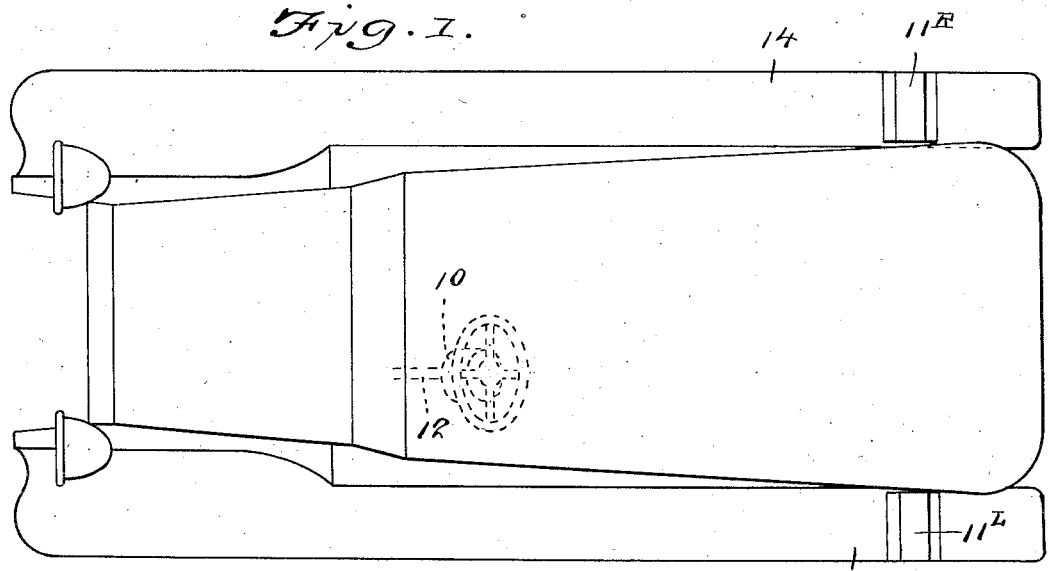
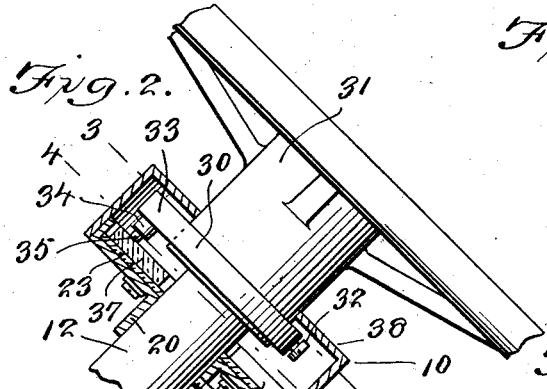
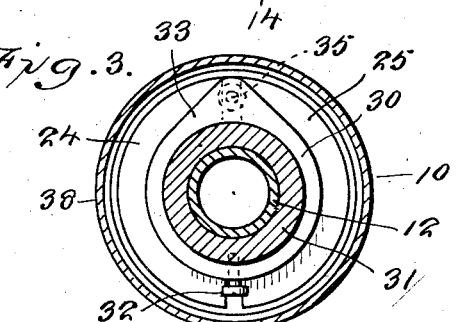
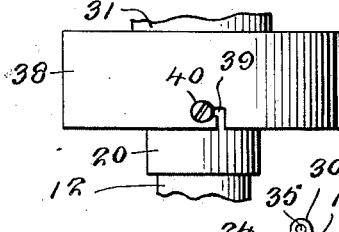
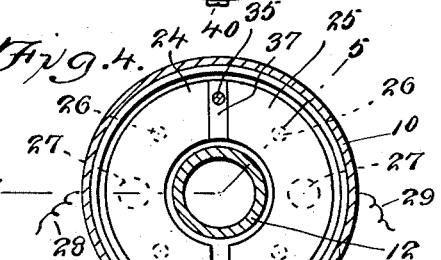
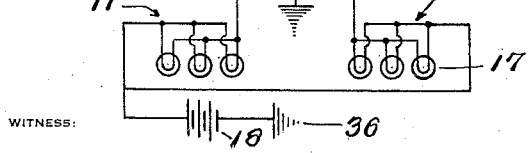
Harry L. Eatz INVENTOR
BY Victor J. Evans & Co.
WITNESS:  ATTORNEY Patented June 2, 1936

2,043,158

UNITED STATES PATENT OFFICE 2,043,158

DIRECTION INDICATOR

Harry L. Eatz, Duquesne, Pa.

Application September 12, 1932, Serial No. 632,825
Renewed November 18, 1935

1 Claim. (Cl. 200—59)

The object of the invention is to provide a direction indicator applicable to vehicles in such a way that the movement of the steering wheel to effect right or left hand turning will result in the energizing of correspondingly identified indicating devices; to provide a direction indicator control readily applicable to the steering wheel and steering wheel column of a motor vehicle without the necessity for any modification thereof or experience on the part of the person making the installation; and generally to provide a device of the kind indicated which is of simple form and susceptible of cheap manufacture.

With this object in view, the invention consists in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claim.

In the drawing:

Figure 1 is a top plan view of a motor vehicle indicating the position of the indicating elements and the control for the same, the latter being shown in dotted lines.

Figure 2 is an elevational view of the hub of the steering wheel and the connected part of the steering column, showing the control element in section but carried by these parts.

Figures 3 and 4 are sectional views on the planes indicated by the lines 3—3 and 4—4 respectively of Figure 2.

Figure 5 is a sectional view on the plane indicated by the line 5—5 of Figure 4.

Figure 6 is an elevational view of the control element.

Figure 7 is a rear elevational view of one of the signalling elements or devices.

Figure 8 is a diagrammatic view showing the manner in which the device is connected up for the actuation of the signal devices.

The control element or device 10 by which the signalling devices or elements 11L and 11R are controlled, is mounted on the steering column 12 of the vehicle, while the signalling devices are preferably mounted on the fenders 14, the signalling devices being in the form of casings provided with transparencies 15, carrying arrows or other indicators 16 and being provided behind the transparencies with illuminating elements 17 which may be either one or a battery of lamps. Whether the indicating elements contain one or more lamps, there will be one terminal connected to the battery 18, the other terminal or terminals being carried to the control element.

The control element comprises a housing which encloses all of the parts, this housing having a bottom or base plate 19 formed with a central eye to permit it being slipped over the steering column 12, the bottom plate being provided with an annular flange 20 bounding the eye, so as to provide in effect a hub portion which will maintain the position of the bottom plate on the steering column when the set screw 21 is set down against the latter, the set screw being threadingly engaged with the annular flange 20 but bearing upon the steering column. The base plate 19 is also formed with an upturned peripheral flange 22 and carries on its top face an insulating disk 23 in peripheral engagement with the inner periphery of the flange 22. This insulating disk 23 serves as an insulating medium for the arcuate segments 24 and 25 which are carried by the base plate and secured thereto by fasteners 26 which may be in the form of screws passing through the base plate and threading into the segments but which must be insulated from the base plate. The segments are also provided with binding posts 27 extended through the base plate but insulated therefrom, these binding posts being for the purpose of connecting the ungrounded terminals of the lamp or lamps in the signalling elements to the segments, as indicated at 28 and 29 in Figure 8.

The segments 24 and 25 constitute stationary contacts of the control element 10, of which the movable contact is in the form of a collar 30 which surrounds the hub 31 of the steering wheel and is secured in position thereon by means of the set screw 32. The collar is formed with a radial extension 33 in the under face of which there is provided a cup 34 for receiving a brush 35, which bears on the upper faces of the two segments, sweeping over the latter, as the steering wheel is turned. The collar 31 is uninsulated from the steering wheel hub, so that this constitutes a grounded terminal to permit the return of the current to the battery 18, which is grounded, according to the customary practice, as indicated at 36.

The space in between the adjacent ends of the segments 24 and 25 on the forward side of the steering column carries an insulating filler block 37, flush with the top faces of the segments, so that the brush 35 may stand on this filler block or slide from it and onto either of the segments or from either of the latter onto it.

To enclose all the parts a cover member 38 is provided, this cover member having a central clearance eye through which the hub 31 of the steering wheel passes, but the cover member telescoping over the peripheral flange of the base disk and being formed at angularly spaced points on its periphery with bayonet slots 39 through which screws 40 pass to secure the cover in position when attached, the screws 40 threading into the peripheral flange 22 of the base plate.

To expose the parts of the control element or switch, the screws are loosened, after which the cover member may be given a slight angular or turning movement which will bring it in position to be withdrawn from engagement with the screws. The cover member is released if repair or replacement of the switch or control element parts is necessary.

In operation, when the vehicle is moving directly forward, the brush 35 will bear on the filler block or segment 37. If the steering wheel be turned, it will result in closing the circuit on either the signalling element 11L or 11R, depending on the direction in which the steering wheel is turned. For example, if turned to the right, the brush will pass onto the segment 25 and current will flow from the battery 18 through the lamps in the signalling element 11R, thence to the segment 25, thence across the brush and its carrier to the steering wheel hub and thence back over the metallic parts of the vehicle to the battery. If the steering wheel be turned to engage the brush with the segment 24, current will flow through the battery, through the lights in the signalling element 11L and thence to the segment 24, returning to the battery through the brush, the brush carrier, the steering column and metallic parts of the vehicle.

The invention having been described, what is claimed as new and useful is:

A direction indicator control comprising a base plate having means for mounting it on the steering column of a motor vehicle in axial coincidence with the column, a pair of arcuate segments arranged in spaced complemental relation to each other, an insulating disk carried by the base, the segments being disposed on top of said disk, a collar for application to the hub of the steering wheel mounted on said steering column, the collar having a radial enlargement, a cup carried by said enlargement, a brush seated in said cup and impelled towards said segments for superficial contact with the top faces of the same, the base being formed with an upturned peripheral flange, and a cover member formed with an opening through which the hub of the steering wheel passes, the cover telescoping and interlocking with said flange and completely enclosing said collar and enlargement.

HARRY L. EATZ.